(12) United States Patent
Tan et al.

(10) Patent No.: US 10,357,752 B1
(45) Date of Patent: Jul. 23, 2019

(54) ASPHALT RESTORATION AGENT MICROCAPSULE AND PREPARATION METHOD AND USE THEREOF

(71) Applicants: Yiqiu Tan, Harbin (CN); Huining Xu, Harbin (CN)

(72) Inventors: Yiqiu Tan, Harbin (CN); Huining Xu, Harbin (CN); Junfeng Su, Harbin (CN); Zhi Zheng, Harbin (CN); Yingyuan Wang, Harbin (CN)

(73) Assignees: Yiqiu Tan, Harbin (CN); Huining Xu, Harbin (CN)

( * ) Notice: Subject to any disclaimer, the term of this patent is extended or adjusted under 35 U.S.C. 154(b) by 0 days.

(21) Appl. No.: 16/199,151

(22) Filed: Nov. 24, 2018

(30) Foreign Application Priority Data

Jun. 1, 2018 (CN) .......................... 2018 1 0557965

(51) Int. Cl.
| | |
|---|---|
| *B01J 13/04* | (2006.01) |
| *C08L 95/00* | (2006.01) |
| *B01J 13/20* | (2006.01) |
| *C08K 3/04* | (2006.01) |
| *E01C 23/02* | (2006.01) |
| *C08L 61/32* | (2006.01) |

(52) U.S. Cl.
CPC ............. *B01J 13/04* (2013.01); *B01J 13/206* (2013.01); *C08K 3/042* (2017.05); *C08L 61/32* (2013.01); *C08L 95/00* (2013.01); *E01C 23/02* (2013.01); *C08L 2207/53* (2013.01)

(58) Field of Classification Search
None
See application file for complete search history.

(56) References Cited

U.S. PATENT DOCUMENTS 5,431,697 A * 7/1995 Kamata ................. B41M 5/267
8/483

FOREIGN PATENT DOCUMENTS

CN 106732222 A 5/2017

* cited by examiner

*Primary Examiner* — Jeffrey D Washville
(74) *Attorney, Agent, or Firm* — Calfee, Halter & Griswold LLP

(57) ABSTRACT

The present invention relates to the field of road restoration, and discloses an asphalt restoration agent microcapsule and a preparation method and use thereof. The asphalt restoration agent microcapsule includes a capsule core containing an asphalt regenerant and a capsule wall wrapping the capsule core and containing graphene and hexamethoxymethylmelamine resin, wherein a mass ratio of the graphene to the hexamethoxymethylmelamine resin is 0.1:100-7:100, and a mass ratio of the asphalt regenerant to the hexamethoxymethylmelamine resin is 1:1-1:4. The preparation method provided by the present invention adopts specific steps and specific material adding sequences, so that the asphalt restoration agent microcapsule prepared through the preparation method has better stability and electrical conductivity and can be added to asphalt mixtures to prolong the service life of asphalt pavements.

15 Claims, 3 Drawing Sheets

ASPHALT RESTORATION AGENT MICROCAPSULE AND PREPARATION METHOD AND USE THEREOF

CROSS REFERENCE TO RELATED APPLICATIONS

This application claims priority to Chinese Application No. 201810557965.9, filed on Jun. 1, 2018, entitled "Asphalt Restoration Agent Microcapsule and Preparation Method and Use Thereof", which is specifically and entirely incorporated by reference.

FIELD OF THE INVENTION

The present invention relates to the road restoration field, in particular to an asphalt restoration agent microcapsule, a preparation method and use of the asphalt restoration agent microcapsule.

BACKGROUND OF THE INVENTION

As polymer materials, asphalt has a certain self-healing or self-rehabilitation capacity and thus is widely applied to roads. In the long-term service process, asphalt components may be changed under the effects of external environmental factors such as sunlight irradiation and rain washing as well as certain internal chemical reactions, inevitably resulting in some tiny cracks and local damage. Without timely control over such micro-damage, these tiny cracks will further expand under the effect of external loads, which will in turn affect the service life of roads. Although asphalt regenerants may be used for compensating asphaltene micromolecules, the direct penetration depth of the asphalt regenerants is not over 2 cm.

Studies have shown that the restoration capacity of asphalt can be improved by wrapping asphalt restoration agents through the microencapsulation technology that enables the restoration agents to be dispersed in the asphalt in the droplet form. Microencapsulation technology is a self-restoration method based on substance supplementation. By wrapping capsule cores with capsule walls, microcapsules will be stimulated when materials are cracked, then the capsule walls break to release the capsule cores to compensate for components of the asphalt that are lost due to aging, and thus the restoration effect is achieved.

CN106732222A discloses an asphalt crack self-restoration microcapsule and a preparation method thereof. The asphalt crack self-restoration microcapsule includes, by mass, 30-50 parts of methylated melamine-formaldehyde resin prepolymer, 20-50 parts of asphalt regenerant, 2-5 parts of styrene-maleic anhydride copolymer, 0.5-2 parts of graphene and 80-120 parts of distilled water. The preparation method of the asphalt crack self-restoration microcapsule includes the following steps. 1) Styrene-maleic anhydride of the constituent quantity is added to distilled water to be swelled for 2-3 hours, an alkaline PH regulator is dropwise added to an obtained solution regulate the PH of the solution to 10-11 until the PH of the solution is stable, and then the solution is stirred for 2-3 hours; 2) graphene of the constituent quantity is added to the solution obtained in step 1) and then ultrasonically oscillated to be evenly mixed, and afterwards, an asphalt regenerant of the constituent quantity is added to the solution and mechanically stirred and emulsified for 10 min-30 min in a high-speed dispersion machine at a preset stirring speed of 700-1200 rpm to obtain an oil-in-water emulsion attached with graphene; and 3) the stirring speed is regulated to 300-400 rpm, then methylated melamine-formaldehyde resin of the constituent quantity is dropwise added to the oil-in-water emulsion at a dropping speed of 0.5-5 ml/min, afterwards, the oil-in-water emulsion is heated to 40-50° C. and then slowly heated to 70-90° C. at a speed of 2° C./min, the temperature is maintained for 10 min every time increased by 5° C., after the oil-in-water emulsion is heated to 70-90° C., an acid pH regulator aqueous solution of the constituent quantity is dropwise added to the oil-in-water emulsion to regulate the pH to 10, the oil-in-water emulsion continues to be solidified for 1-2 h, and finally is slowly cooled to the room temperature at a cooling speed of 2° C./min, centrifuged to separate out a product and diluted with water for centrifugal separation again, and the asphalt crack self-restoration microcapsule is obtained after vacuum drying. In this method, due to the fact that no chemical bond is formed between wall resin and graphene, the graphene fails to firmly adhere to the wall surface, resulting in a negative influence on electrical conductivity.

Moreover, ice-snow covered pavements are always a hot topic in road engineering studies as snow and ice accumulated on roads severely affect the transportation condition, particularly in alpine regions. Nowadays, asphalt pavements are typically passively maintained and protected against freezing; however, all these methods have the requirement for applying external forces to the pavements, resulting in a high cost, a poor effect and negative influences on the ambient environment in the construction process.

In light of this, it is extremely urgent to realize good aging resistance and ice and snow resistance of asphalt pavements for the current high-traffic, high-load transportation environment.

SUMMARY OF THE INVENTION

One objective of the present invention is to solve the problems of poor aging resistance and poor snow and ice resistance of the asphalt pavements in the prior art by providing an asphalt restoration agent microcapsule, a preparation method and use thereof. The asphalt restoration agent microcapsule provided by the present invention has low electrical resistivity and good stability.

To fulfill the above objective, in the first aspect, the present invention provides an asphalt restoration agent microcapsule, comprising a capsule core and a capsule wall wrapping the capsule core, wherein the capsule core contains asphalt regenerant, the capsule wall contains graphene and hexamethoxymethylmelamine resin (甲醚化六羟甲基三聚氰胺树脂), the mass ratio of the graphene to the hexamethoxymethylmelamine resin is 0.1:100-7:100, the mass ratio of the asphalt regenerant to the hexamethoxymethylmelamine resin is 1:1-1:4.

In the second aspect, the present invention provides a preparation method of an asphalt restoration agent microcapsule, comprising:

(1) swelling a first emulsifier in distilled water, regulating pH of an obtained solution till the solution is alkaline, then asphalt regenerant is added to the solution and stirred to obtain a first mixture;

(2) ultrasonically dispersing graphene, a second emulsifier and water, and then adding hexamethoxymethylmelamine resin to obtain a second mixture;

(3) adding the second mixture to the first mixture to obtain a third mixture; and (4) regulating pH of the third mixture till the third mixture is acid, and then solidifying, separating and drying the third mixture.

In the third aspect, the present invention provides an asphalt restoration agent microcapsule prepared through the above preparation method.

In the fourth aspect, the present invention provides a use of the asphalt restoration agent microcapsule in road asphalt paving.

The asphalt restoration agent microcapsule provided by the present invention contains, in a certain proportion, the asphalt regenerant, the graphene and the hexamethoxymethylmelamine resin. The asphalt regenerant is wrapped in the hexamethoxymethylmelamine resin, and the graphene added to the capsule wall improves the stability and electrical conductivity of the microcapsule. In addition, according to the preparation method of the asphalt restoration agent microcapsule of the present invention, the graphene, the second emulsifier and water are ultrasonically dispersed first, so that the defect of agglomeration caused by large specific surface energy and low weight of the graphene is avoided. The preparation method provided by the present invention adopts specific steps and specific material adding sequences, so that the asphalt restoration agent microcapsule prepared through the preparation method has better stability and electrical conductivity and can be added to asphalt mixtures to prolong the service life of asphalt pavements.

DETAILED DESCRIPTION OF THE EMBODIMENTS

Figure 1:
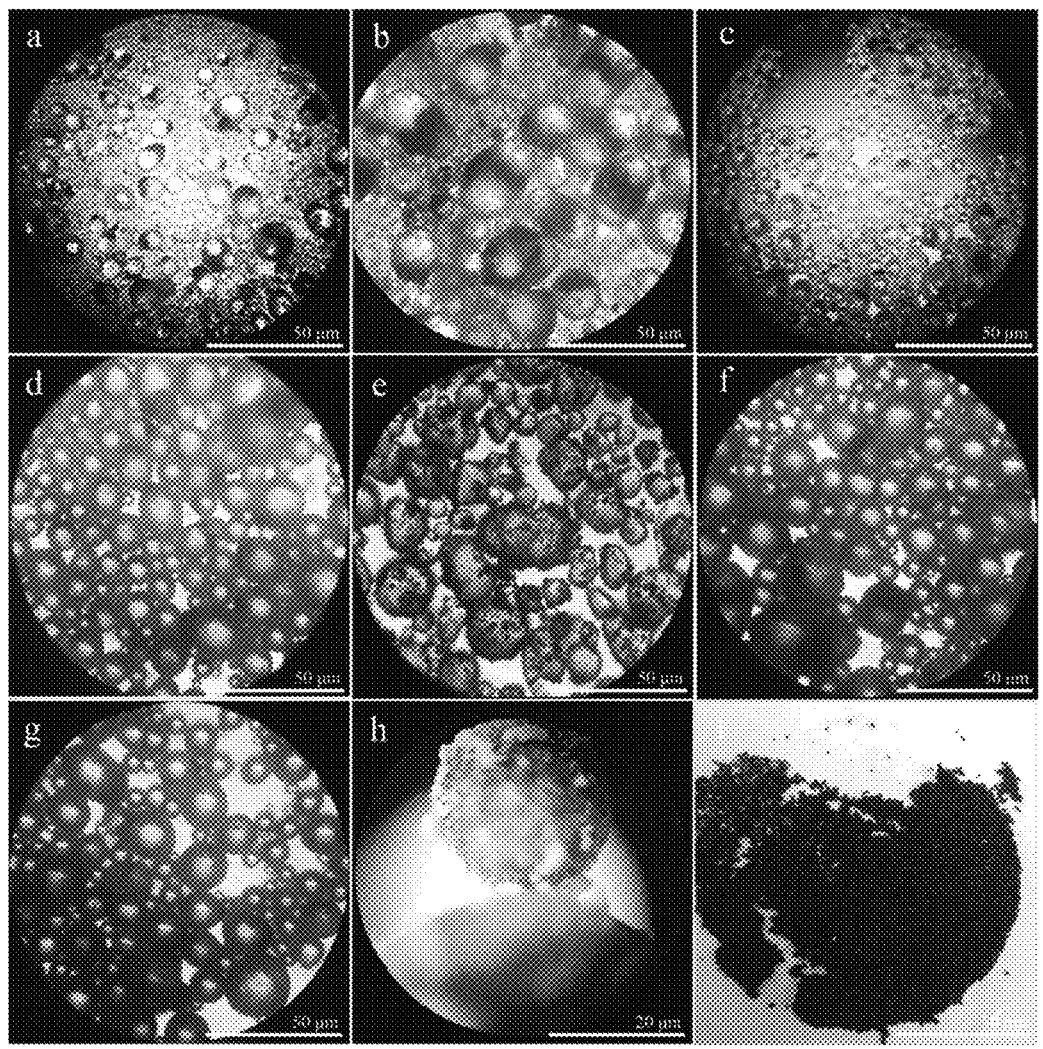
FIG. 1 is an optical microphotograph of microcapsule S-1 obtained in Example 1 of the present invention.

Hereunder some embodiments of the present invention will be detailed with reference to the accompanying drawings. It should be understood that the embodiments described here are only provided to describe and explain the present invention, but shall not be deemed as constituting any limitation to the present invention.

The end points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

The present invention provides an asphalt restoration agent microcapsule, comprising a capsule core and a capsule wall wrapping the capsule core, the capsule core contains asphalt regenerant, the capsule wall contains graphene and methylated hexamethylol melanine (HMMM) resin. The mass ratio of the graphene to the hexamethoxymethylmelamine resin is 0.1:100-70.1:100, the mass ratio of the asphalt regenerant to the hexamethoxymethylmelamine resin is 1:1-1:4.

The microcapsule of the present invention refers to a micro-wrapper with a polymer wall, and substances in the microcapsule are isolated from the outside and thus will not be affected by the environment, thereby being kept stable. The substances encapsulated in the microcapsule can also be released under proper conditions.

The asphalt regenerant is a chemical additive that is added to asphalt mixtures and used for recovering the performance of aged asphalt. The asphalt regenerant is not solely a certain product and can be formulated into series products according to requirements to adapt to different regeneration conditions. In the present invention, there is no particular restriction on the asphalt regenerant and can be any one selected from various asphalt regenerants commonly used in this field, such as asphalt regenerant RA25, asphalt regenerant ZS-1 and asphalt regenerant ZS-2 which mainly includes saturated component and aromatic component, wherein asphalt regenerant RA25 has a kinematic viscosity of 176 cst at 60° C., asphalt regenerant ZS-1 has a flash point over 195° C., and asphalt regenerant ZS-2 has a kinematic viscosity of 96 cst at 60° C.

The asphalt regenerant of the present invention can be prepared or purchased, for instance, commercially available asphalt regenerant ZS-1 from Zhenjiang Daoyi Material Technology Co., Ltd.

The inventor of the present invention discovered during the research process, that the microcapsule containing the asphalt regenerant wrapped in the hexamethoxymethylmelamine resin has good stability. There is no particular restriction on the hexamethoxymethylmelamine resin of the present invention, preferably, the hexamethoxymethylmelamine resin has a rotary viscosity of 3000-6000 mpa·s at 25° C. and contains no less than 98% of nonvolatile elements (105° C., 1.5 h).

According to one preferred embodiment of the present invention, the mass ratio of the graphene to the hexamethoxymethylmelamine resin is 0.5:100-5:100. This preferred embodiment is more beneficial for ensuring the compact structure of the microcapsule and improving the stability of the microcapsule.

According to one preferred embodiment of the present invention, the mass ratio of the asphalt regenerant to the hexamethoxymethylmelamine resin is 1:2-1:3. This preferred embodiment is more beneficial for ensuring the compact structure of the microcapsule and improving the stability of the microcapsule.

According to the present invention, the capsule wall preferably includes a first wall layer and a second wall layer from inside to outside, wherein the first wall layer contains the hexamethoxymethylmelamine resin, and the second wall layer contains the graphene. In the present invention, the direction from the capsule core to the capsule wall is defined as direction from inside to outside. In this preferred embodiment, the outer layer of the hexamethoxymethylmelamine resin is evenly wrapped with the graphene, which is more conducive to improvement the stability and electrical conductivity of the microcapsule.

The present invention provides a preparation method of an asphalt restoration agent microcapsule, comprising:

(1) swelling a first emulsifier in distilled water, regulating pH of an obtained solution till the solution is alkaline, then asphalt regenerant is added to the solution and stirred to obtain a first mixture;

(2) ultrasonically dispersing graphene, a second emulsifier and water, and then adding hexamethoxymethylmelamine resin to obtain a second mixture;

(3) adding the second mixture to the first mixture to obtain a third mixture; and (4) regulating pH of the third mixture till the third mixture is acid, and then solidifying, separating and drying the third mixture.

According to the preparation method provided by the present invention, the first emulsifier preferably is an oil-in-water emulsifier, more preferably is selected from styrene-maleic anhydride (SMA), Tween 80(吐温 80) and OP-10, and furthermore preferably is styrene-maleic anhydride. After being swelled in the distilled water, styrene-maleic anhydride turns into an anionic surfactant. Moreover, styrene-maleic anhydride has better stability, is charged with negative electricity after turning into the anionic surfactant, and can react on the surfaces of droplets due to charge adsorption during polymerization reaction.

The condition and execution mode for the first emulsifier to swell in the distilled water are not particularly specified in the present invention, namely, the first emulsifier can be swelled in the distilled water through common technological means in this field, for instance, the first emulsifier can be swelled in the distilled water at the room temperature (25° C.) for 2-3 h. If the temperature is too low, the swelling effect will be affected, which will in turn affect the emulsifying capacity of the first emulsifier.

The quantity of water added in the swelling process is not particularly specified in the present invention. Preferably, the mass content of the asphalt regenerant in the first mixture is 5-20% and preferably is 5-15%.

According to one preferred embodiment of the present invention, the pH is regulated to 8-11 in step (1) and preferably is regulated to 9-11.

Substances for pH regulation in step (1) are not particularly specified in the present invention, for instance, sodium hydroxide can be used for pH regulation. Specifically, 5 wt % of sodium hydroxide solution can be used for pH regulation.

According to one preferred embodiment of the present invention, the mass ratio of the first emulsifier to the asphalt regenerant is 3:100-15:100 and preferably is 5:100-10:100. By adoption of this preferred embodiment for secondary coagulation, charges are balanced to achieve secondary coagulation through electrostatic adsorption under the effect of the anionic emulsifier during interfacial polymerization, making the wall more compact.

According to one preferred embodiment of the present invention, the mass ratio of the asphalt regenerant to the hexamethoxymethylmelamine resin is 1:1-1:4 and preferably is 1:2-1:3. This preferred embodiment is more beneficial for ensuring the compact structure of the microcapsule and improving the stability of the microcapsule.

According to one specific embodiment of the present invention, the preparation method further comprises stirring after pH regulation in step (1), wherein the stirring time may be 2-3 h, and the stirring speed may be 300-400 rpm.

According to one specific embodiment of the present invention, an asphalt regenerant is added in step (1) and stirred to obtain a first mixture, wherein the stirring time is 10-60 min and preferably is 20-40 min, and the stirring speed is 2000-3000 rpm.

According to the present invention, the mass ratio of the graphene to the hexamethoxymethylmelamine resin preferably is 0.1:100-7:100 and more preferably is 0.5:100-5:100.

According to the present invention, the mass ratio of the second emulsifier to the asphalt regenerant preferably is 0.05:100-1:100 and more preferably is 0.1:100-0.5:100.

According to the present invention, the second emulsifier can be a non-ionic emulsifier and preferably is selected from polyoxyethylene nonyl phenyl ether (NP-10), N-methyl pyrrolidone and N,N-dimethylformamide, and most preferably is polyoxyethylene nonyl phenyl ether.

According to one optimal embodiment of the present invention, the first emulsifier is styrene-maleic anhydride, and the second emulsifier is polyoxyethylene nonyl phenyl ether. The inventor of the present invention discovered, in the research process, that this preferred embodiment reduces the surface tension of substances and is beneficial for compounding the first emulsifier and the second emulsifier and more beneficial for forming a microcapsule with better stability and electical conductivity.

According to the present invention, graphene, a second emulsifier and water are ultrasonically dispersed first, then hexamethoxymethylmelamine resin is added to obtain a second mixture, and afterwards, the second mixture is dropwise added to the first mixture, in step (2). By adoption of this preferred embodiment, the graphene is evenly dispersed, so that the defect of agglomeration caused by a large specific surface area and low weight of the graphene is avoided, and thus the graphene firmly adheres to the surface of the microcapsule.

According to one preferred embodiment of the present invention, the ultrasonic dispersion time is over 10 min and preferably is 20-40 min.

According to the present invention, the content of the hexamethoxymethylmelamine resin in the second mixture is 10-40 wt % and preferably is 20-35 wt %.

According to the present invention, the second mixture is preferably dropwise added to the first mixture, and more preferably, based on 1 L of the first mixture, the dropping speed of the second mixture is 1-3 ml/min and preferably is 1.5-2.5 ml/min. This preferred embodiment reduces deformation, caused by graphene addition, of the capsule wall of the microcapsule in the formation process. Due to the fact that insufficient reaction of the hexamethoxymethylmelamine resin will be caused if the dropping speed is too high, this preferred embodiment provides a sufficient reaction time for the hexamethoxymethylmelamine resin, enabling nanoparticles to adhere to the first wall layer to form a composite capsule wall.

In this present invention, the situation that based on 1 L of the first mixture, the dropping speed of the second mixture is 1-3 ml/min refers to that 1-3 ml of second mixture is dropwise added per minute based on 1 L of the first mixture. Those skilled in the field wound appreciate that if 2-6 ml of second mixture is dropwise added per minutes based on 2 L of the first mixture, the dropping speed of the second mixture is 2-6 ml/min based on 2 L of the first mixture.

According to the present invention, in step (4), the pH of the third mixture is regulated to make the third mixture acid first and then the third mixture is solidified, and the pH of the third mixture is preferably regulated to 3.5-6.5 and more preferably is regulated to 4-5. Acid for regulating the pH of the third mixture is not particularly specified, preferably is one or more selected from acetic acid, citric acid and succinic acid, and most preferably is acetic acid, for instance, can be 10 wt % of acetic acid solution.

According to the present invention, solidification conditions preferably comprises: solidification temperature is 65-90° C., solidification time is 1-4 h, more preferably, solidification temperature is 75-85° C., solidification time is 1-2.5 h.

According to one preferred embodiment of the present invention, in the solidification process, the third mixture is heated to the solidification temperature at a heating speed of 1-4° C./min and more preferably at a heating speed of 2-3° C./min. In the present invention, the solidification time does not include the heating time.

According to one preferred embodiment of the present invention, in the heating process, the temperature is maintained for 5-15 min every time increased by 4-6° C. In the present invention, in step (4), the pH of the third mixture is regulated to make the third mixture acid first and then the third mixture is solidified; and compared with a scheme that pH regulation is conducted after heating to the solidification temperature, acid volatilization is reduced. In addition, by adoption of the above preferred heating method, the whole reaction is carried out at a relatively low temperature for a period of time, which facilitates a more sufficient polymerization reaction.

The preparation method of the present invention may further comprise the step of cooling a solidification reaction product to the room temperature after solidification and then carrying out the separation. Preferably, the cooling speed is 1-3° C./min.

In the present invention, any common separation methods can be used, such as centrifugal separation.

In order to further improve the performance of the product, the preparation method preferably further comprises the step of washing a solid product obtained through separation. Water can be used as a washing agent to wash the solid product.

Drying conditions are not particularly specified in the present invention, and preferably comprise: drying temperature is 60-100° C. and drying time is 2-4 h.

The present invention further provides an asphalt restoration agent microcapsule prepared through the above preparation method. The asphalt restoration agent microcapsule, comprising a capsule core and a capsule wall wrapping the capsule core, the capsule core contains an asphalt regenerant, the capsule wall contains graphene and hexamethoxymethylmelamine resin, the mass ratio of the graphene to the hexamethoxymethylmelamine resin is 0.1:100-7:100, the mass ratio of the asphalt regenerant to the hexamethoxymethylmelamine resin is 1:1-1:4. Other technical characteristics of such asphalt restoration agent microcapsule are as mentioned above and will not be described in detail anymore.

The present invention further provides a use of the asphalt restoration agent microcapsule in road asphalt paving. The asphalt restoration agent microcapsule provided by the present invention can be added to road asphalt mixtures to be used for road paving. The asphalt restoration agent microcapsule will be stimulated when materials are cracked, the capsule wall then breaks to release the asphalt regenerant to compensate for components of the asphalt that are lost due to aging, and thus the restoration effect is achieved. The graphene added to the asphalt restoration agent microcapsule and matched with other components improves the inherent electrical conductivity and heat conductivity of the microcapsule. By adding the asphalt restoration agent microcapsule to road asphalt mixtures, the service life of asphalt pavements is prolonged, and meanwhile, the improvement of the electrical conductivity achieves low-voltage heat production and reduces the adhesion strength of ice to pavements, ensuring road safety in winter and reducing pavement maintenance costs.

The present invention is described in detail as follows in combination with examples. In the following examples, the electrical resistivity of the asphalt restoration agent microcapsule is measured on a powder resistivity tester through a four-probe method. The stability of the asphalt restoration agent microcapsule is measured on a thermogravimetric analyzer through a thermogravimetric test method.

Hexamethoxymethylmelamine resin (HMMM) is highly-methylated aminoresin from Hunan Xuetian Fine Chemical Industry Co., Ltd.

Asphalt regenerant is commercially-available asphalt regenerant ZS-1 from Zhenjiang Daoyi Material Technology Co., Ltd and mainly includes aromatic component and saturated component.

Graphene is commercially-available graphene from Shenzhen Tuling Evolutionary Technology Co., Ltd.

Styrene-maleic anhydride is commercially-available styrene-maleic anhydride Scripset 520 from Hercules.

Polyoxyethylene nonyl phenyl ether (NP-10) is commercially-available polyoxyethylene nonyl phenyl ether from Linyi Shuaihang Imp. And Exp. Co., Ltd.

Example 1

(1) 1.5 g of styrene-maleic anhydride (SMA) was swelled in 250 ml of distilled water at room temperature (25° C.) for 2.5 h, pH of an obtained solution was regulated to 10 with 5 wt % of NaOH solution, the obtained solution was stirred for 2.5 h, then 15 g of asphalt regenerant was added to the solution, and the solution was mechanically stirred (2000 rpm) and emulsified for 20 min in a high-speed dispersion machine at a preset rotation speed, so that an oil-in-water emulsion (first mixture) was obtained;

(2) graphene, water and NP-10 were ultrasonically dispersed for 20 min, and then 30 g of hexamethoxymethylmelamine resin was added to obtain a second mixture, wherein the mass ratio of the graphene to the hexamethoxymethylmelamine resin was 5:100, the mass ratio of the NP-10 to the asphalt regenerant was 0.3:100, and the content of the hexamethoxymethylmelamine resin in the second mixture was 20 wt %;

(3) the second mixture was slowly dropped into the first mixture to obtain a third mixture, wherein based on 1 L of the first mixture, the dropping speed of the second mixture was 2 ml/min; and (4) 10 wt % of acetic acid solution was dropwise added to the third mixture to regulate pH to 4.5, afterwards, the third mixture was heated to 80° C. from the room temperature (25° C.) at a heating speed of 2° C./min (the temperature is maintained for 10 min every time increased by 5° C.), solidified for 1.5 h, then cooled to the room temperature at a cooling speed of 2° C./min, centrifugally separated to obtain a product and centrifugally separated again after being washed with water, and microcapsule S-1 was obtained after vacuum drying (at a temperature of 80° C. for 3 h).

Figure 2:
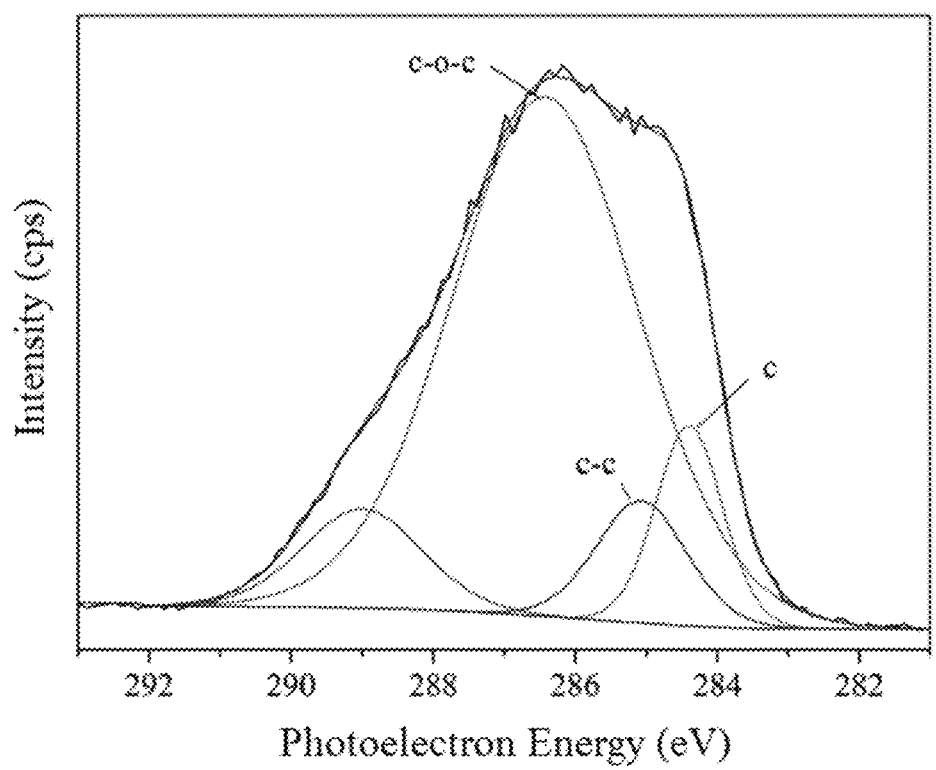
FIG. 2 is an X-ray photoelectron spectrometry (XPS) of microcapsule S-1 obtained in Example 1 of the present invention.

The microcapsule S-1 was analyzed. From FIG. 1 which shows an optical microphotograph of microcapsule S-1 (under different multiplying factors), it can be seen from the FIG. 1, the microcapsule S-1 comprises a capsule core and a capsule wall wrapping the capsule core. As is shown in FIG. 2 for an XPS of microcapsule S-1, it can be learned through analysis that the carbon on the surface of the microcapsule is in the form of C—C bonds and C—O—C bonds in the resin or carbon in the graphene based on different degrees of binding energy, which proves that the capsule wall definitely contains graphene. XPS tests for the surface elements of the product, only under the condition that the graphene wraps the hexamethoxymethylmelamine resin, the graphene can be represented. In addition, the hexamethoxymethylmelamine resin will be further solidified on droplet surfaces after being added while no chemical bonds will be formed between the graphene and the hexamethoxymethylmelamine resin, and thus the graphene is exposed on the surface of the hexamethoxymethylmelamine resin.

Figure 3:
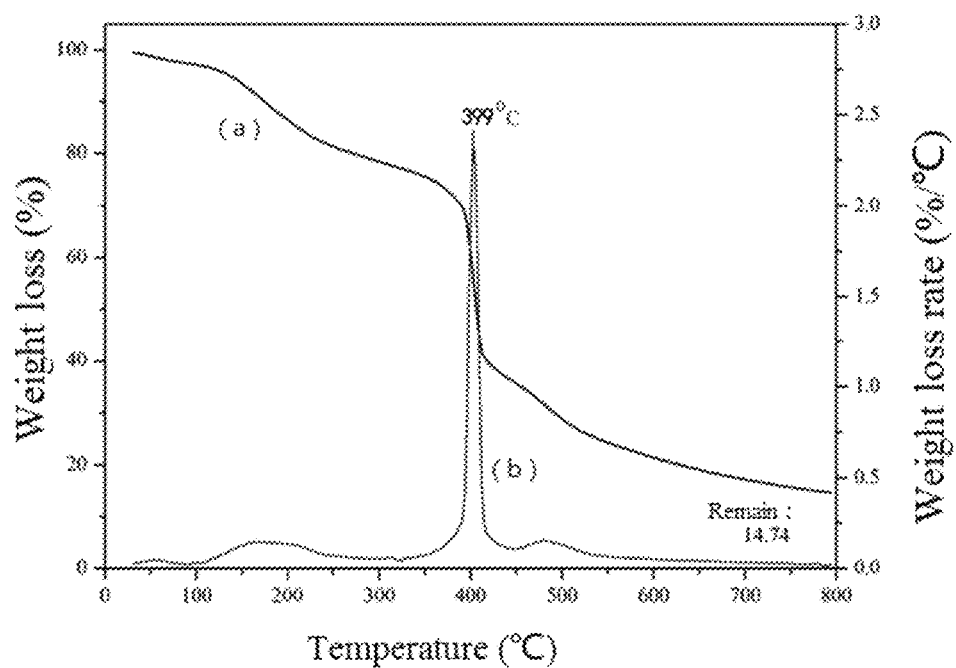
FIG. 3 shows a TG-DTA curve of microcapsule S-1 obtained in Example 1 of the present invention.

FIG. 3 shows a TG-DTA analysis result of microcapsule S-1, wherein curve (a) is a TG curve of microcapsule S-1, and curve (b) is a DTA curve of microcapsule S-1. From curve (a), slight weight reduction occurs before 200° C. and is mainly regarded as moisture reduction of the capsule wall, and weight reduction before 385° C. is always small. From curve (b), a peak value appears at 399° C. and is mainly considered to be caused by high-temperature decomposition of the asphalt regenerant after the microcapsule cracks. Microcapsule S-1 has an electrical resistivity of $3.8 \times 10^{-2}$ $\Omega \cdot m$.

Comparative Example 1

Figure 4:
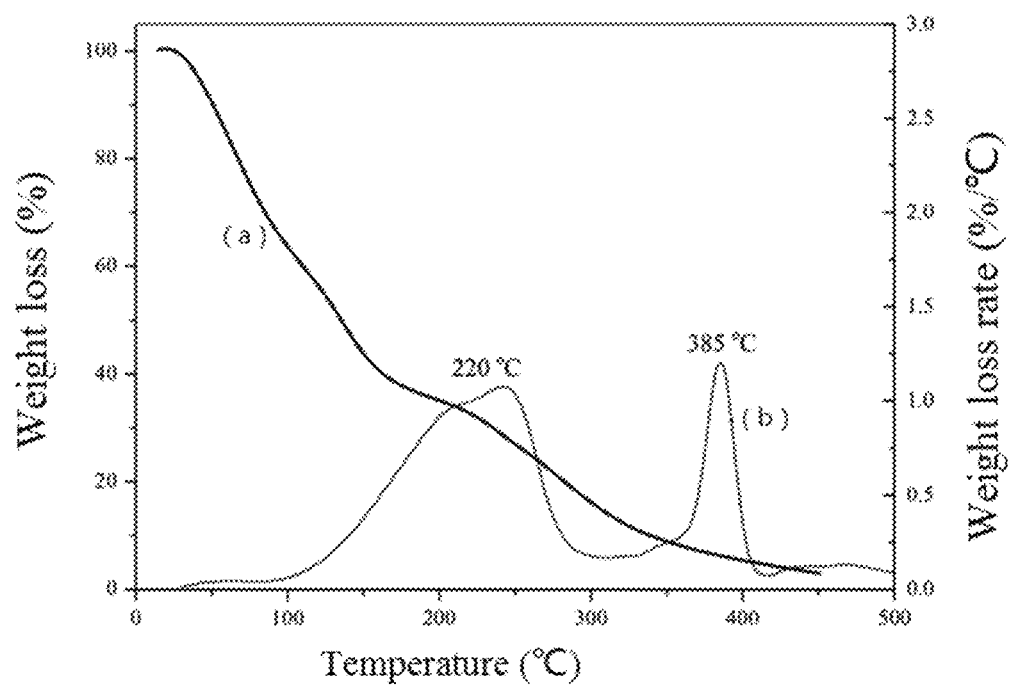
FIG. 4 shows a TG-DTA curve of microcapsule D-1 obtained in Comparative Example 1.

Microcapsule is prepared according to the Example 1, but no graphene was added in the preparation process of a microcapsule. Specifically, 30 g of hexamethoxymethylmelamine resin was mixed with water to obtain a second mixture containing 20 wt % of hexamethoxymethylmelamine resin in step (2), and then step (3) and step (4) were performed according to Example 1 to obtain microcapsule D-1. Microcapsule D-1 does not contain graphene, and analysis on microcapsule D-1 indicates that microcapsule D-1 has an electrical resistivity of $1.5 \times 10^{13}$ $\Omega \cdot m$. FIG. 4 shows a TG-DTA analysis result of microcapsule D-1, wherein curve (a) is a TG curve of microcapsule D-1, and curve (b) is a DTA curve of microcapsule D-1. From curve (a), the weight of microcapsule D-1 starts to be gradually decreased from 120° C. From curve (b), peak values appear at 220° C. and 385° C. and are considered to be mainly caused by further decomposition of the resin on the outer layer and volatilization of the asphalt regenerant. The stability of microcapsule D-1 is obviously inferior to that of microcapsule S-1.

Comparative Example 2

Microcapsule is prepared according to the Example 1, but the hexamethoxymethylmelamine resin was replaced with a methylated melamine-formaldehyde resin prepolymer of the same mass to obtain microcapsule D-2. Through analysis, microcapsule D-2 has an electrical resistivity of 50 $\Omega \cdot m$. TG-DTA of microcapsule D-2 shows that the stability of microcapsule D-2 is obviously inferior to that of microcapsule S-1.

Comparative Example 3

1.5 g of styrene-maleic anhydride (SMA) was swelled in 250 ml of distilled water at room temperature (25° C.) for 2.5 h, the pH of an obtained solution was regulated to 10 with 5 wt % of NaOH solution, the obtained solution was stirred for 2.5 h, graphene of the constituent quantity was added to the obtained solution and ultrasonically oscillated to be evenly mixed, and then 15 g of asphalt regenerant was added to the solution and mechanically stirred (2000 rpm) for 20 min in a high-speed dispersion machine at a preset rotation speed; and afterwards, hexamethoxymethylmelamine resin of the constituent quantity was dropwise added to the solution at a dropping speed of 2 ml/min (the addition quantity of the hexamethoxymethylmelamine resin and the addition quantity of the graphene were the same as those in Example 1), and then reaction was carried out according to step (4) in Example 1, so that microcapsule D-3 was obtained. Through analysis, microcapsule D-3 has an electrical resistivity of 70 $\Omega \cdot m$. Due to the fact that the graphene is not completely dispersed, agglomeration occurs easily when the hexamethoxymethylmelamine resin is added, and consequentially, the hexamethoxymethylmelamine resin is prone to depositing onto the bottom of the reactor rather than adhering to droplet surfaces, resulting in low reaction efficiency.

Example 2

(1) 0.75 g of styrene-maleic anhydride (SMA) was swelled in 250 ml of distilled water at room temperature (25° C.) for 2.5 h, pH of an obtained solution was regulated to 9 with 5 wt % of NaOH solution, the obtained solution was stirred for 2 h, then 15 g of asphalt regenerant was added to the solution, and the solution was mechanically stirred (2500 rpm) and emulsified for 30 min in a high-speed dispersion machine at a preset rotation speed, so that an oil-in-water emulsion (first mixture) was obtained;

(2) graphene, water and NP-10 were ultrasonically dispersed for 30 min, and then 45 g of hexamethoxymethylmelamine resin was added to obtain a second mixture, wherein the mass ratio of the graphene to the hexamethoxymethylmelamine resin was 3:100, the mass ratio of the NP-10 to the asphalt regenerant was 0.1:100, and the content of the hexamethoxymethylmelamine resin in the second mixture was 35 wt %;

(3) the second mixture was slowly dropped into the first mixture to obtain a third mixture, wherein based on 1 L of the first mixture, the dropping speed of the second mixture was 2.5 ml/min; and (4) 10 wt % of acetic acid solution was dropwise added to the third mixture to regulate the pH to 4, afterwards, the third mixture was heated to 75° C. from the room temperature (25° C.) at a heating speed of 3° C./min (the temperature was maintained for 15 min every time increased by 6° C.), solidified for 1 h, then cooled to the room temperature at a cooling speed of 2° C./min, centrifugally separated to obtain a product, and centrifugally separated again after being washed with water, and microcapsule S-2 was obtained after vacuum drying (at a temperature of 60° C. for 4 h).

Microcapsule S-2 was analyzed. XPS and TG-DTA analysis results of microcapsule S-2 are similar to those in Example 1. Microcapsule S-2 has an electrical resistivity of $5 \times 10^{-2}$ $\Omega \cdot m$.

Example 3

(1) 1 g of styrene-maleic anhydride (SMA) was swelled in 250 ml of distilled water at room temperature (25° C.) for 2.5 h, pH of an obtained solution was regulated to 11 with 5 wt % of NaOH solution, the obtained solution was stirred for 3 h, then 15 g of asphalt regenerant was added to the solution, and the solution was mechanically stirred (3000 rpm) and emulsified for 40 min in a high-speed dispersion machine at a preset rotation speed, so that an oil-in-water emulsion (first mixture) was obtained;

(2) graphene, water and NP-10 were ultrasonically dispersed for 40 min, and then 40 g of hexamethoxymethylmelamine resin was added to obtain a second mixture, wherein the mass ratio of the graphene to the hexamethoxymethylmelamine resin was 5:100, the mass ratio of the NP-10 to the asphalt regenerant was 0.5:100, and the content of the hexamethoxymethylmelamine resin in the second mixture was 30 wt %;

(3) the second mixture was slowly dropped into the first mixture to obtain a third mixture, wherein based on 1 L of the first mixture, the dropping speed of the second mixture was 1.5 ml/min; and (4) 10 wt % of acetic acid solution was dropwise added to the third mixture to regulate the pH to 5, afterwards, the third mixture was heated to 85° C. from the room temperature (25° C.) at a heating speed of 2.5° C./min (the temperature was maintained for 5 min every time increased by 4° C.), solidified for 2 h, then cooled to the room temperature at a cooling speed of 2° C./min, centrifugally separated to obtain a product and centrifugally separated again after being washed with water, and microcapsule S-3 was obtained after vacuum drying (at a temperature of 70° C. for 3 h).

Microcapsule S-3 was analyzed. XPS and TG-DTA analysis results of microcapsule S-3 are similar to those in Example 1. Microcapsule S-3 has an electrical resistivity of $4 \times 10^{-2}$ Ω·m.

Example 4

Microcapsule is prepared according to the method of the Example 1, except that styrene-maleic anhydride was replaced with Tween 80 of the same mass, so that microcapsule S-4 was obtained. Microcapsule S-4 was analyzed. An XPS analysis result of microcapsule S-4 is similar to that in Example 1. Microcapsule S-4 has an electrical resistivity of 10 Ω·m. TG-DTA of microcapsule S-4 shows that the stability of microcapsule S-4 is inferior to that of microcapsule S-1.

Example 5

Microcapsule is prepared according to the method of the Example 1, except that NP-10 was replaced with N-methyl pyrrolidone of the same mass, so that microcapsule S-5 was obtained. Microcapsule S-5 was analyzed. An XPS analysis result of microcapsule S-5 is similar to that in Example 1. Microcapsule S-5 has an electrical resistivity of $3 \times 10^{-2}$ Ω·m. TG-DTA of microcapsule S-5 shows that the stability of microcapsule S-5 is slightly inferior to that of microcapsule S-1.

Example 6

Microcapsule is prepared according to the method of the Example 1, except that 60 g of hexamethoxymethylmelamine resin was added in step (2), so that microcapsule S-6 was obtained. Microcapsule S-6 was analyzed. An XPS analysis result of microcapsule S-6 is similar to that in Example 1. Microcapsule S-6 has an electrical resistivity of 13 Ω·m. TG-DTA of microcapsule S-6 shows that the stability of microcapsule S-6 is slightly inferior to that of microcapsule S-1.

Example 7

Microcapsule is prepared according to the method of the Example 1, except that the mass ratio of graphene to hexamethoxymethylmelamine resin was 0.3:100, so that microcapsule S-7 was obtained. Microcapsule S-7 was analyzed. An XPS analysis result of microcapsule S-7 is similar to that in Example 1. Microcapsule S-7 has an electrical resistivity of $4.5 \times 10^{-2}$ Ω·m. TG-DTA of microcapsule S-7 shows that the stability of microcapsule S-7 is slightly inferior to that of microcapsule S-1.

Example 8

Microcapsule is prepared according to the method of the Example 1, except that the ultrasonic dispersion time was 10 min in step (2), so that microcapsule S-8 was obtained. Microcapsule S-8 was analyzed. An XPS analysis result of microcapsule S-8 is similar to that in Example 1. Microcapsule S-8 has an electrical resistivity of 11 Ω·m. TG-DTA of microcapsule S-8 shows that the stability of microcapsule S-8 is slightly inferior to that of microcapsule S-1.

Example 9

Microcapsule is prepared according to the method of the Example 1, except that based on 1 L of the first mixture, the dropping speed of the second mixture was 3.5 ml/min in step (3), so that microcapsule S-9 was obtained. Microcapsule S-9 was analyzed. An XPS analysis result of microcapsule S-9 is similar to that in Example 1. Microcapsule S-9 has an electrical resistivity of 150 Ω·m. TG-DTA of microcapsule S-9 shows that the stability of microcapsule S-9 is slightly inferior to that of microcapsule S-1. Due to the excessively high dropping speed, the capsule wall of the microcapsule deforms slightly, lowering the stability of the microcapsule.

Example 10

Microcapsule is prepared according to the method of the Example 1, except that after pH regulation, the third mixture was directly heated to 80° C. from the room temperature (25° C.) at a heating speed of 5° C./min and solidified for 2.5 h in step (4), so that microcapsule S-10 was obtained. Microcapsule S-10 was analyzed. An XPS analysis result of microcapsule S-10 is similar to that in Example 1. Microcapsule S-10 has an electrical resistivity of $4.2 \times 10^{-2}$ Ω·m. TG-DTA of microcapsule S-9 shows that the stability of microcapsule S-10 is slightly inferior to that of microcapsule S-1.

The preferred embodiments of the present invention are described above, but the present invention is not limited to the above embodiments. Various simple alterations of the technical schemes of the present invention, such as any proper combinations of the technical characteristics, based on the technical conception of the present invention should be regarded as contents disclosed by the present invention and all should fall within the protection scope of the present invention.

The invention claimed is:

1. An asphalt restoration agent microcapsule, comprising a capsule core and a capsule wall wrapping the capsule core,
wherein the capsule core contains an asphalt regenerant, the capsule wall contains graphene and hexamethoxymethylmelamine resin, a mass ratio of the graphene to the hexamethoxymethylmelamine resin is from 0.1:100-7:100, and a mass ratio of the asphalt regenerant to the hexamethoxymethylmelamine resin is from 1:1-1:4,
wherein the capsule wall includes a first wall layer and a second wall layer from inside to outside, the first wall layer contains the hexamethoxymethylmelamine resin, and the second wall layer contains the graphene.

2. The asphalt restoration agent microcapsule according to claim 1, wherein the mass ratio of the graphene to the hexamethoxymethylmelamine resin is from 0.5:100-5:100 and the mass ratio of the asphalt regenerant to the hexamethoxymethylmelamine resin is from 1:2-3:100.

3. A method of preparing an asphalt restoration agent microcapsule, comprising:
   (1) swelling a first emulsifier in distilled water, regulating the pH of an obtained solution till the solution is alkaline, and then an asphalt regenerant is added to the solution and stirred to obtain a first mixture;
   (2) ultrasonically dispersing graphene, a second emulsifier and water, and then adding hexamethoxymethylmelamine resin to obtain a second mixture, wherein the second emulsifier is selected from polyoxyethylene nonyl phenyl ether, N-methyl pyrrolidone and N,N-dimethylformamide;
   (3) adding the second mixture to the first mixture to obtain a third mixture; and
   (4) regulating the pH of the third mixture till the third mixture is acidic, and then solidifying, separating and drying the third mixture.

4. The method according to claim 3, wherein the first emulsifier is selected from styrene-maleic anhydride, Tween 80 and OP-10; and/or
   in step (1), the pH of the obtained solution is regulated to 8-11; and/or
   a mass ratio of the first emulsifier to the asphalt regenerant is from 3:100-15:100.

5. The method according to claim 3, wherein the first emulsifier is styrene-maleic anhydride; and/or
   in step (1), the pH of the obtained solution is regulated to 9-11; and/or
   a mass ratio of the first emulsifier to the asphalt regenerant is from 5:100-10:100.

6. The method according to claim 3, wherein a mass ratio of the asphalt regenerant to the hexamethoxymethylmelamine resin is from 1:1-1:4; and/or
   a mass ratio of the graphene to the hexamethoxymethylmelamine resin is from 0.1:100-7:100; and/or
   a mass ratio of the second emulsifier to the asphalt regenerant is from 0.05:100-1:100; and/or
   an ultrasonic dispersion time is over 10 min.

7. The method according to claim 3, wherein a mass ratio of the asphalt regenerant to the hexamethoxymethylmelamine resin is from 1:2-1:3; and/or
   a mass ratio of the graphene to the hexamethoxymethylmelamine resin is from 0.5:100-5:100; and/or
   a mass ratio of the second emulsifier to the asphalt regenerant is from 0.1:100-0.5:100; and/or
   the second emulsifier is polyoxyethylene nonyl phenyl ether; and/or
   an ultrasonic dispersion time is 20-40 min.

8. The method according to claim 3, wherein in step (3), the second mixture is dropwise added to the first mixed, and based on 1 L of the first mixture, a dropping speed of the second mixture is from 1-3 ml/min.

9. The method according to claim 8, wherein based on 1 L of the first mixture, the dropping speed of the second mixture is from 1.5-2.5 ml/min.

10. The method according to claim 3, wherein the pH of the third mixture is regulated to 3.5-6.5.

11. The method according to claim 3, wherein the pH of the third mixture is regulated to 4-5.

12. The method according to claim 3, wherein in step (4), solidification conditions comprises: solidification temperature is 65-90° C. and solidification time is from 1-4 h.

13. The method according to claim 12, wherein the solidification temperature is reached by heating at a heating speed of 1-4° C./min.

14. The method according to claim 13, wherein during heating, the temperature is maintained for 5-15 min every time the temperature is increased by 4-6° C.

15. A road asphalt mixture comprising:
   the asphalt restoration agent microcapsule of claim 1, and asphalt.

* * * * *